United States Patent [19]
Macholdt et al.

[11] Patent Number: 6,117,606
[45] Date of Patent: Sep. 12, 2000

[54] USE OF PIGMENT YELLOW 155 IN ELECTROPHOTOGRAPHIC TONERS AND DEVELOPERS, POWDER COATINGS AND INKJET INKS

[75] Inventors: Hans-Tobias Macholdt, Darmstadt-Eberstadt; Ruediger Baur, Eppstein-Niederjosbach; Josef Ritter, Bad Soden, all of Germany

[73] Assignee: Clariant GmbH, Frankfurt, Germany

[21] Appl. No.: 09/164,782

[22] Filed: Oct. 1, 1998

[30] Foreign Application Priority Data

Oct. 6, 1997 [DE] Germany ............................ 197 44 097
Feb. 7, 1998 [DE] Germany ............................ 198 04 899

[51] Int. Cl.$^7$ .................................................. G03G 9/08
[52] U.S. Cl. .................... 430/106; 430/137; 106/31.81
[58] Field of Search ............................ 430/45, 106, 137; 106/31.79, 31.81, 31.86, 31.89

[56] References Cited

U.S. PATENT DOCUMENTS

| | | | |
|---|---|---|---|
| 3,997,521 | 12/1976 | Forter et al. | 260/176 |
| 4,759,801 | 7/1988 | Goldmann et al. | 106/502 |
| 5,660,959 | 8/1997 | Moriyama et al. | 430/45 |
| 5,889,162 | 3/1999 | Hays | 534/581 |

FOREIGN PATENT DOCUMENTS

| | | |
|---|---|---|
| 0208041 | 1/1987 | European Pat. Off. . |
| 0705886 | 4/1996 | European Pat. Off. . |
| 0866367 | 9/1998 | European Pat. Off. . |
| 0875788 | 11/1998 | European Pat. Off. . |
| WO 97/08255 | 3/1997 | WIPO . |

OTHER PUBLICATIONS

European Search Report Derwent Patent Family Report and/or Abstract.

*Primary Examiner*—John Goodrow
*Attorney, Agent, or Firm*—Susan S. Jackson; Scott E. Hanf

[57] ABSTRACT

C.I. Pigment Yellow 155 is used as a colorant in electrophotographic toners and developers, powder coating materials, inkjet inks, color filters and electret materials.

19 Claims, No Drawings

USE OF PIGMENT YELLOW 155 IN ELECTROPHOTOGRAPHIC TONERS AND DEVELOPERS, POWDER COATINGS AND INKJET INKS

BACKGROUND OF THE INVENTION

In electrophotographic recording techniques a "latent charge image" is produced on a photoconductor. This latent charge image is then developed by applying an electrostatically charged toner which is then transferred to, for example, paper, textiles, foils or plastic and is fixed by means, for example, of pressure, radiation, heat or the action of solvent. Typical toners are one- or two-component powder toners (also called one- or two-component developers), and there are also specialty toners, such as magnetic, liquid and polymerization toners, that are employed.

One measure of the quality of a toner is its specific charge q/m (charge per unit mass). In addition to the sign and level of the electrostatic charge, the principal, decisive quality criteria are the rapid attainment of the desired charge level and the constancy of this charge over a prolonged activation period. In addition to this, the insensitivity of the toner to climatic effects such as temperature and atmospheric humidity is a further important criterion for its suitability.

Both positively and negatively chargeable toners are used in photocopiers, laser printers, LEDs (light emitting diodes), LCS (liquid crystal shutter) printers or other digital printers based on electrophotographic techniques, depending on the type of process and type of apparatus.

To obtain electrophotographic toners or developers having either a positive or a negative charge it is common to add charge control agents. The chromophoric component employed in color toners typically comprises organic color pigments. Color pigments have considerable advantages over dyes owing to their insolubility in the application medium, examples of these advantages being better thermal stability and light fastness.

On the basis of the principle of subtractive color mixing, the three primary colors, yellow, cyan and magenta, can be used to reproduce the entire spectrum of color that is visible to the human eye. Exact color reproduction is possible only if the respective primary color meets the precisely defined coloristic requirements. Otherwise, it is not possible to reproduce some shades, and the color contrast is inadequate.

In full-color toners, in addition to the precisely defined coloristic requirements, the three toners yellow, cyan and magenta must also be matched exactly to one another in terms of their triboelectric properties, since they are transferred in succession in the same apparatus.

It is known that colorants may in some cases have a sustained effect on the triboelectric charge of toners. Because of the different triboelectric effects of colorants and the resulting effect, sometimes very pronounced, on toner chargeability, it is not possible simply to add the colorants to a toner base formulation made available at the start. On the contrary, it may be necessary to make available for each colorant an individual formulation to which the nature and the amount of the required charge control agent are tailored specifically. This procedure is, accordingly, laborious and, in the case of color toners for the three-color process, represents a further difficulty in addition to those already described above.

Another important practical requirement is that the colorants should have high thermal stability and good dispersibility. Typical temperatures at which colorants are incorporated into the toner resins, when using kneading equipment or extruders, are between 100° C. and 200° C. Correspondingly, thermal stability at 200° C., and better still at 250° C., is of great advantage. It is also important for the thermal stability to be assured over a relatively long period (about 30 minutes) and in a variety of binder systems. Typical toner binders are addition polymerization resins, polyaddition resins and polycondensation resins, such as styrene, styrene-acrylate, styrene-butadiene, acrylate, polyester, phenolic-epoxy resins, polysulfones and polyurethanes, individually or in combination, which may also include further components, such as charge control agents, waxes or flow assistants, or may have these components added subsequently.

The requirement is fundamentally for a yellow pigment which possesses very high transparency, greenishness, good dispersibility and, as far as possible, a neutral inherent triboelectric effect.

By a neutral inherent triboelectric effect is meant that the pigment exhibits as little effect as possible on the inherent electrostatic charge of the resin.

The transparency is of central importance since in full-color copying or printing the colors yellow, cyan and magenta are copied or printed on top of one another, the sequence of colors depending on the apparatus. If, then, an overlying color is not sufficiently transparent, the color below it is unable to show through to an adequate extent and the color reproduction is distorted. When copying or printing onto overhead sheets, the transparency is even more important, since a lack of transparency here even in only one color makes the entire projected image appear gray.

SUMMARY OF THE INVENTION

The present invention relates to an electrophotographic toner and to developers, powder coating materials and inkjet inks based on C.I. Pigment Yellow 155 as colorant.

The object of the present invention was to provide a fairly inexpensive, highly transparent and greenish yellow azo colorant having, as far as possible, a neutral inherent triboelectric effect, good dispersibility and high thermal stability, for use in electrophotographic toners and developers, powders and powder coating materials, in inkjet inks and in electret materials, which colorant should not be based on dichlorobenzidine and should also not carry any halo, nitro or amino substituents, so as to be highly unobjectionable from an ecotoxicological standpoint. In addition to this, the colorant should be free from additives, i.e., should consist of the chromophoric component. The addition of additives to colorants is often necessary in order to obtain the best coloristic properties (color strength, transparency, etc.) and performance properties (dispersibility). For electrophotographic toners, especially for liquid toners and polymerization toners, and also for inkjet inks, however, such additives are a disadvantage owing, inter alia, to their inherent electrostatic effect and their ease of leaching.

This object has surprisingly been achieved by the azo pigment detailed below. The present invention provides for the use of an azo pigment of the formula (I)

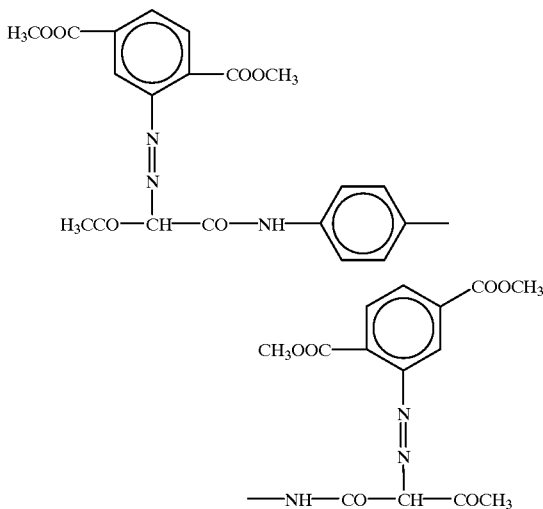

as a colorant in electrophotographic toners and developers, powders and powder coating materials, electret materials, color filters and inkjet inks.

DESCRIPTION OF THE PREFERRED EMBODIMENTS

A pigment with the structure according to formula (1) is already known and is sold as C.I. Pigment Yellow 155. The preparation of C.I. Pigment Yellow 155 is known and is described, for example, in W. Herbst, K. Hunger "Industrial Organic Pigments", Verlag Chemie, Weinheim, 1993 and the literature cited therein. What is novel and surprising is that the pigment, which per se is unsuitable for polyesters (W. Herbst, K. Hunger "Industrielle Organische Pigmente", Verlag Chemie, Weinheim 1995, page 272), exhibits very good properties, such as very good dispersibility and very high transparency, even in toner resins based on polyester.

In addition, the pigment is surprisingly notable for a neutral inherent electrostatic effect.

A further great advantage is that the pigment possesses a thermal stability of more than 300° C.

Conventional azo pigments have a marked negative electrostatic effect (P. Gregory, "High Technology Applications of Organic Colorants", Plenum Press, New York 1991, pp. 99–102). EP-A-0 359 123 describes how by adding appropriate ammonium, immonium, phosphonium, arsonium or stibonium compounds it is possible to alleviate or even eliminate the strong negative tribo effect, the addition of said additives having to be made either during the coupling reaction, in the course of laking, or during the pigment finish.

It has, furthermore, been described how by means of special masterbatches—that is, highly concentrated preliminary dispersions of pigment in selected resins—it is possible to suppress the inherent triboelectric effect of pigments (V. Schlösser et al. Society of Imaging Science and Technology, 11th Congress on Advances in Non-Impacting Printing Technologies, Hilton Head, S.C., Oct. 29–Nov. 11, 1995, Proceedings pp. 110–112). Leaving aside the additional workstep, this method has the disadvantage that a custom-tailored masterbatch must be used for each toner resin, something which is extremely laborious and unprofitable commercially. If only the masterbatch based on the standard resin indicated is used, the toner system becomes contaminated by foreign resin.

With the use of the azo pigment of the invention, the disadvantages of such additional worksteps are avoided.

Apart from its use in electrophotographic toners and developers, the inherent triboelectric effect of a pigment can also lead to an improvement in the electrostatic charging of powders and coating materials, especially in triboelectrically or electrokinetically sprayed powder coating materials as are used to coat surfaces of articles made from, for example, metal, wood, plastic, glass, ceramic, concrete, textile material, paper or rubber. Powder coating technology is employed, for example, when coating small articles, such as garden furniture, camping equipment, domestic appliances, vehicle components, refrigerators and shelving, and for coating workpieces of complex shape. The powder coating material or the powder receives its electrostatic charge, in general, by one of the following two processes:

a) in the corona process, powder coating material or powder, under guidance, passes a charged corona and in so doing becomes charged;

b) in the triboelectric or electrokinetic process, the principle of frictional electricity is utilized.

Within the spraying apparatus, the powder coating material or powder receives an electrostatic charge which is opposite to the charge of its friction partner, generally a hose or spray pipe made, for example, of polytetrafluoroethylene. It is also possible to combine the two processes.

Typical powder coating resins employed are epoxy resins, polyester resins containing carboxyl and hydroxyl groups, polyurethane resins and acrylic resins, together with the conventional curing agents (hardeners). Resin combinations are also used. For example, epoxy resins are frequently employed in combination with polyester resins containing carboxyl and hydroxyl groups. Typical curing components for epoxy resins are, for example, acid anhydrides, imidazoles and dicyandiamide, and derivatives thereof. Examples of typical curing components for hydroxyl-containing polyester resins are acid anhydrides, blocked isocyanates, bisacylurethanes, phenolic resins and melamine resins. For carboxyl-containing polyester resins typical curing components are, for example, triglycidyl isocyanurates or epoxy resins. In acrylic resins, the curing components employed are typically oxazolines, isocyanates, triglycidyl isocyanurates or dicarboxylic acids, for example. The disadvantage of inadequate charging can be seen above all in triboelectrically or electrokinetically sprayed powders and powder coating materials, which have been prepared using polyester resins, especially carboxyl-containing polyesters, or using so-called mixed powders, also known as hybrid powders. Mixed powders are powder coating materials whose resin base consists of a combination of epoxy resin and carboxyl-containing polyester resin. Mixed powders form the basis of the powder coating materials used most commonly in practice. Inadequate charging of the abovementioned powders and powder coating materials results in an inadequate deposition rate and throwing power on the workpiece to be coated, it being known in this context that under certain circumstances the inherent triboelectric effect of a pigment may also be responsible for the loss of chargeability of a resin system which is suitable per se. The term "throwing power" is a measure of the extent to which a powder or powder coating material is deposited on the workpiece to be coated, including its rear faces, cavities, fissures and, in particular, its inner edges and angles.

Furthermore, a modified inherent triboelectric effect of a pigment may lead to an improvement in the electret properties in the case of colored (pigmented) electret materials, typical electret materials being based on polyolefins, halogenated polyolefins, polyacrylates, polyacrylonitriles, polystyrenes or fluoropolymers, examples being polyethylene, polypropylene, polytetrafluoroethylene and perfluorinated ethylene and propylene, or on polyesters, polycarbonates, polyamides, polyimides, polyether ketones, polyarylene sulfides, especially polyphenylene sulfides, polyacetals, cellulose esters, polyalkylene terephthalates, and mixtures thereof. Electret materials have numerous fields of use and may acquire their charge through corona charging or triboelectric charging (Ref.: G. M. Sessler, "Electrets", Topics in Applied Physics, Vol. 33, Springer Verlag, New York, Heidelberg, 2nd Ed., 1987).

Furthermore, a modified inherent triboelectric effect of a pigment may lead to enhanced separation characteristics of colored (pigmented) polymers which are separated by electrostatic methods (Y. Higashiyau, J. of Electrostatics, 30, 1993, 203–212). Accordingly, the inherent triboelectric effect of pigments is important for the mass coloring of plastics as well. This inherent triboelectric effect is also significant in process or processing steps which entail intense frictional contact, examples being spinning processes, film-drawing processes or other shaping processes.

The special advantage of the C.I. Pigment Yellow 155 of the invention is evident in particular in comparison to C.I. Pigment Yellow 180 of the formula

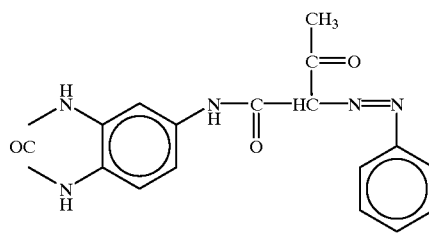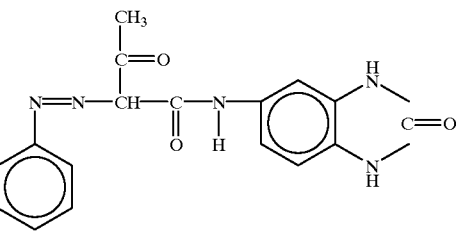

C.I. Pigment Yellow 180 is employed as colorant in numerous yellow toners and for the toner industry can, accordingly, be regarded as a standard for azo pigments which are not based on dichlorobenzidine, carry no halo, nitro or amino groups, and also contain no heavy metal ions in their structure.

Thus, C.I. Pigment Yellow 155 exhibits, for example, a pronounced neutral inherent triboelectric effect, whereas C.I. Pigment Yellow 180 displays a perceptible inherent triboelectric effect; in other words, a toner with, say, 5% P.Y. 155 exhibits, in electrostatic terms, almost the same chargeability as the resin system alone without pigment, whereas P.Y. 180 perceptibly alters the electrostatic chargeability. Furthermore, depending on what is required, P.Y. 155 can be formulated to be more transparent or more hiding.

In addition, the shade of P.Y. 155 can be coloristically influenced by mixing P.Y. 155 with other pigments.

A task frequently encountered in connection with electrophotographic color toners, triboelectrically sprayable powder coating materials or inkjet inks is to shade the hue and adapt it to the requirements of the specific application. Particularly appropriate for this purpose are organic color pigments, inorganic pigments, and dyes. For shading the hue it is preferred to employ organic color pigments in mixtures with P.Y. 155 in concentrations of between 0.01 and 50% by weight, preferably between 0.1 and 25% by weight and, with particular preference, between 0.1% and 15% by weight, based on P.Y. 155. In this case the organic color pigments can be from the group of the azo pigments or polycyclic pigments. In a particularly preferred variant a greenish yellow P.Y. 155 can be shaded by reddish yellow pigment types, such as P.Y. 139, P.Y. 83, P.Y. 181, P.Y. 191, P.Y. 75, P.Y. 180 or P.Y. 97, in the manner of a 2-component mixture. Mixtures of a plurality of components are likewise appropriate. Relatively large steps in hue are possible, for example, when using orange pigments, such as P.O. 62, P.O. 36, P.O. 34, P.O. 13, P.O. 43 or P.O. 5, or red/magenta pigments, such as P.R. 122, P.V. 19, P.R. 57, P.R. 48, P.R. 146, P.R. 185 or P.R. 184. The hue of P.Y. 155 can be fine-tuned using, for example, mixtures with P.Y. 185 and P.Y. 180, which have the additional advantage from the ecological standpoint that all of the components are chlorine-free.

The mixtures can be produced in the form of the powders, by mixing presscakes and spray-dried presscakes, and by dispersion (extrusion, kneading, roll-mill processes, bead mills, Ultra-Turrax) in the presence of a carrier material in solid or liquid form (aqueous and nonaqueous inks) and by flushing in the presence of a carrier material.

Particularly appropriate for increasing the brightness and, in some cases, for shading the hue at the same time are mixtures with organic dyes. Preferred such dyes are water-soluble dyes, such as Direct, Reactive and Acid Dyes, and also solvent-soluble dyes, such as Solvent Dyes, Disperse Dyes and Vat Dyes. Specific examples that may be mentioned are C.I. Reactive Yellow 37, Acid Yellow 23, Reactive Red 23, 180, Acid Red 52, Reactive Blue 19, 21, Acid Blue 9, Direct Blue 199, Solvent Yellow 14, 16, 25, 56, 64, 79, 81, 82, 83:1, 93, 98, 133, 162, 174, Solvent Red 8, 19, 24, 49, 89, 90, 91, 109, 118, 119, 122, 127, 135, 160, 195, 212, 215, Solvent Blue 44, 45, Solvent Orange 60, 63, Disperse Yellow 64, Vat Red 41.

It is also possible to employ dyes and pigments having fluorescent properties, such as ®Luminols (Riedel-de Haën), in concentrations of from 0.0001 to 30% by weight, preferably from 0.001 to 50% by weight and with very particular preference, between 0.001 and 5%, based on P.Y. 155, in order, for example, to produce forgeryproof toners.

Inorganic pigments, such as $TiO_2$ or $BaSO_4$, are used in mixtures for lightening. Also suitable are mixtures of P.Y. 155 with special-effect pigments, such as pearl luster pigments, $Fe_2O_3$ pigments (®Paliocroms) and pigments based on cholesteric polymers, for example.

The P.Y. 155 employed in accordance with the invention can also be combined with numerous charge control agents, providing either positive or negative control, in order to achieve good performance chargeabilities.

Examples of suitable charge control agents are:
triphenylmethanes; ammonium and immonium compounds; iminium compounds; fluorinated ammonium and immonium compounds; biscationic acid amides;

polymeric ammonium compounds; diallylammonium compounds; aryl sulfide derivatives; phenol derivatives; phosphonium compounds and fluorinated phosphonium compounds; calix(n)arenes; cyclically linked oligosaccharides (cyclodextrins) and their derivatives, especially boron ester derivatives, interpolyelectrolyte complexes (IPECs); polyester salts; metal complex compounds, especially salicylate metal and salicylate nonmetal complexes, α-hydroxycarboxylic acid-metal and -nonmetal complexes; benzimidazolones; and azines, thiazines or oxazines which are listed in the Colour Index as Pigments, Solvent Dyes, Basic Dyes or Acid Dyes.

Particular preference is given to the charge control agents cited below, which can be combined individually, or in combination with one another, with the azo pigment of the invention.

Triarylmethane derivatives, such as, for example:

Colour Index Pigment Blue 1, 1:2, 2, 3, 8, 9, 9:1, 10, 10:1, 11, 12, 14, 18, 19, 24, 53, 56, 57, 58, 59, 61, 62, 67 or, for example, Colour Index Solvent Blue 2, 3, 4, 5, 6, 23, 43, 54, 66, 71, 72, 81, 124, 125, and the triarylmethane compounds listed in the Colour Index under Acid Blue and Basic Dye, provided their temperature stability and processability are suitable, such as Colour Index Basic Blue 1, 2, 5, 7, 8, 11, 15, 18, 20, 23, 26, 36, 55, 56, 77, 81, 83, 88, 89, Colour Index Basic Green 1, 3, 4, 9, 10, with very particular suitability being possessed in turn by Colour Index Solvent Blue 125, 66 and 124.

A particularly suitable substance is Colour Index Solvent Blue 124 in the form of its highly crystalline sulfate or of the trichlorotriphenylmethyltetrachloroaluminate. Very particular preference is given to metal complexes having the CAS Numbers 84179-66-8 (chromium azo complex), 115706-73-5 (iron azo complex), 31714-55-3 (chromium azo complex), 84030-55-7 (chromium salicylate complex), 42405-40-3 (chromium salicylate complex) and also to the quaternary ammonium compound CAS No.11681046-9.

Examples of charge control agents of the triphenylmethane series that are highly suitable for the production of electret fibers are the compounds described in DE-A-1 919 724 and DE-A-1 644 619.

Other suitable triphenylmethanes are those described in U.S. Pat. No. 5,051,585, especially those of the formula (2)

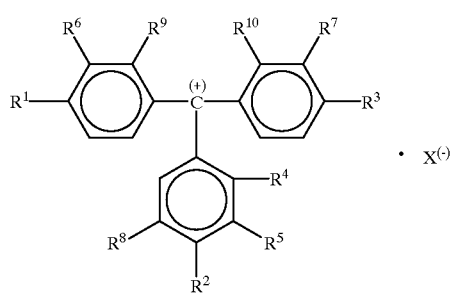

(2)

in which $R^1$ and $R^3$ are identical or different and are —$NH_2$, a mono- or dialkylamino group whose alkyl groups have 1 to 4, preferably 1 or 2, carbon atoms, a mono- or di-omega-hydroxyalkylamino group, whose alkyl groups have 2 to 4, preferably 2, carbon atoms, an unsubstituted or N-alkyl-substituted phenyl amino or phenalkylamino group whose alkyl has 1 to 4, preferably 1 or 2, carbon atoms, whose phenalkyl group has 1 to 4, preferably 1 or 2, carbon atoms in the aliphatic bridge and whose phenyl ring may carry one or two of the following substituents: alkyl of 1 or 2 carbon atoms, alkoxy of 1 or 2 carbon atoms, and the sulfo group, $R^2$ is hydrogen or is as defined for $R^1$ and $R^3$, $R^4$ and $R^5$ are hydrogen, halogen, preferably chlorine, or a sulfo group, or $R^4$ together with $R^5$ forms a fused-on phenyl ring, $R^6$, $R^7$, $R^9$ and $R^{10}$ are each hydrogen or an alkyl radical of 1 or 2 carbon atoms, preferably methyl, and $R^8$ is hydrogen or halogen, preferably chlorine, and $X^-$ is a stoichiometric equivalent of an anion, especially a chloride, sulfate, molybdate, phosphoromolybdate or borate anion.

Particular preference is given to a charge control agent of the formula (2) in which $R^1$ and $R^3$ are phenylamino groups, $R^2$ is an m-methylphenylamino group and the radicals $R^4$ to $R^{10}$ are all hydrogen.

Also suitable are ammonium and immonium compounds as described in U.S. Pat. No. 5,015,676.

Further suitable compounds are the fluorinated ammonium and immonium compounds described in U.S. Pat. No. 5,069,994, especially those of the formula (3)

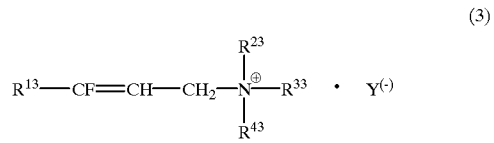

(3)

in which $R^{13}$ is perfluorinated alkyl having 5 to 11 carbon atoms, $R^{23}$, $R^{33}$ and $R^{43}$ are identical or different and are alkyl having 1 to 5, preferably 1 to 2, carbon atoms, and $Y^-$ is a stoichiometric equivalent of an anion, preferably of a tetrafluoroborate or tetraphenylborate anion.

Preferably, $R^{13}$ is perfluorinated alkyl having 5 to 11 carbon atoms, $R^{23}$ and $R^{33}$ are ethyl, and $R^{43}$ is methyl.

Also suitable are biscationic acid amides, as described in WO 91/10172, especially those of the formula (4)

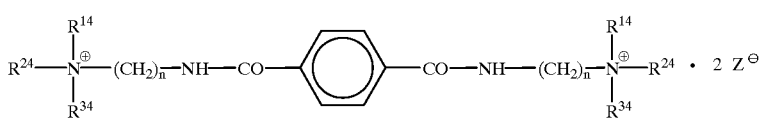
(4)

in which
R$^{14}$, R$^{24}$ and R$^{34}$ are identical or different alkyl radicals having 1 to 5 carbon atoms, preferably methyl,
n is an integer from 2 to 5, and
Z$^-$ is a stoichiometric equivalent of an anion, preferably a tetraphenylborate anion.

Further suitable compounds are diallylammonium compounds as described in DE-A-4 142 541, especially those of the formula (5)

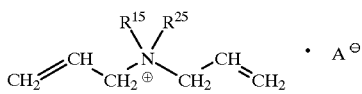
(5)

in which
R$^{15}$ and R$^{25}$ are identical or different alkyl groups having 1 to 5, preferably 1 or 2, carbon atoms, but in particular are methyl groups, and A$^-$ is a stoichiometric equivalent of an anion, preferably a tetraphenylborate anion, and the polymeric ammonium compounds, obtainable from said diallylammonium compounds, of the formula (6), as described in DE-A-4 029 652 or DE-A-4 103 610,

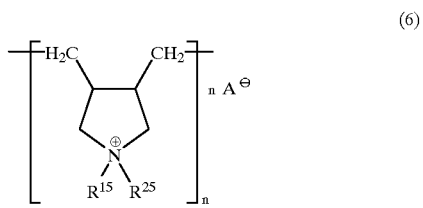
(6)

in which n has a value which corresponds to molecular weights of from 5000 to 500,000 g/mol. Particular preference, however, is given to compounds of the formula (6) having molecular weights of from 40,000 to 400,000 g/mol.

Also suitable are aryl sulfide derivatives, as described in DE-A-4 031 705, especially those of the formula (7)

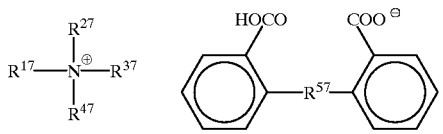
(7)

in which
R$^{17}$, R$^{27}$, R$^{37}$ and R$^{47}$ are identical or different alkyl groups having 1 to 5, preferably 2 or 3, carbon atoms, and
R$^{57}$ is one of the divalent radicals —S—, —S—S—, —SO— and —SO$_2$—.

For example, R$^{17}$ to R$^{47}$ are propyl groups and R$^{57}$ is the group —S—S—.

Also suitable are phenol derivatives, as described in EP-A-0 258 651, especially those of the formula (8)

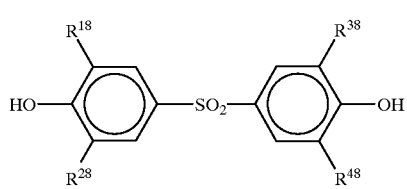
(8)

in which
R$^{18}$ and R$^{38}$ are alkyl or alkenyl groups having 1 to 5, preferably 1 to 3, carbon atoms, and R$^{28}$ and R$^{48}$ are hydrogen or alkyl having 1 to 3 carbon atoms, preferably methyl.

Examples that may be mentioned are the compounds in which R$^{18}$ to R$^{48}$ are methyl groups or in which R$^{28}$ and R$^{48}$ are hydrogen and R$^{18}$ and R$^{38}$ are the group —CH$_2$—CH=CH$_2$.

Further suitable compounds are phosphonium compounds and fluorinated phosphonium compounds, as described in U.S. Pat. No. 5,021,473 and in U.S. Pat. No. 5,147,748, especially those of the formulae (9)

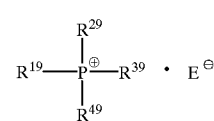
(9)

in which
R$^{19}$, R$^{29}$, R$^{39}$ and R$^{49}$ are identical or different alkyl groups having 1 to 8, preferably 3 to 6, carbon atoms and E$^\ominus$ is a stoichiometric equivalent of an anion, preferably a halide anion;
and (10)

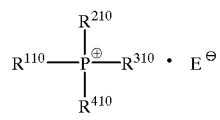
(10)

in which
R$^{110}$ is a highly fluorinated alkyl radical having 5 to 15, preferably 6 to 10, carbon atoms, and
R$^{210}$, R$^{310}$ and R$^{410}$ are alkyl having 3 to 10 carbon atoms or are phenyl.

An example that may be mentioned of a compound of the formula (9) is tetrabutylphosphonium bromide; examples of compounds of the formula (10) that may be mentioned are the compounds where R$^{110}$=C$_8$F$_{17}$—CH$_2$—CH$_2$—, $R^{210}=R^{310}=R^{410}$=phenyl and $E^{\ominus}=PF_6^{\ominus}$ or the tetraphenylborate anion.

Also suitable are calix(n)arenes, as described in EP-A-0 385 580 and as described in EP-A-0 516 434, especially those of the formula (11a) and (11 b) (Angew. Chemie (1993), 195, 1258)

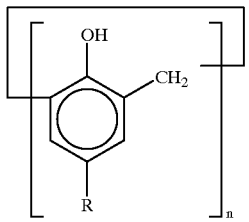
(11a)

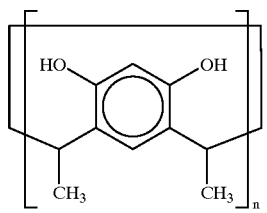
(11b)

in which n is a number from 3 to 12 and

R is hydrogen, halogen, preferably chlorine, straight-chain or branched alkyl having 1 to 12 carbon atoms, aralkyl, e.g. benzyl or phenethyl, $-NO_2$, $-NH_2$ or $NHR^{111}$, where $R^{111}$ is alkyl having 1 to 8 carbon atoms, unsubstituted or $C_1-C_4$-alkyl-substituted phenyl or $-Si(CH_3)_3$.

Suitability extends further to metal complex compounds, such as chromium-, cobalt-, iron-, zinc- or aluminum-azo complexes, or chromium-, cobalt-, iron-, zinc- or aluminum-salicylic or boric acid complexes, of the formulae (12), (13) and (14)

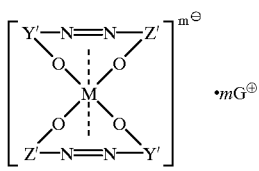
(12)

in which

M is a 2- or 3-valent metal atom, preferably chromium, cobalt, iron, zinc or aluminum, or a nonmetal, such as boron or Si, Y' and Z' are divalent aromatic rings, preferably of the formula

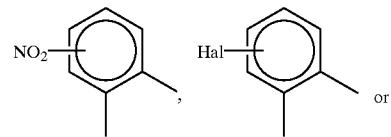

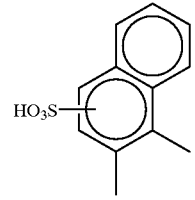

and m is 1 or 2;

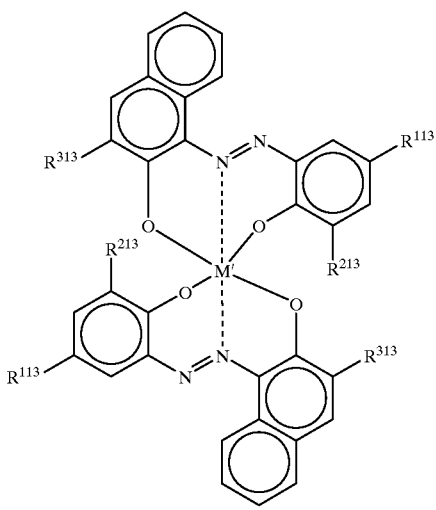
(13)

in which

M' is a 2- or 3-valent metal atom, preferably chromium, cobalt or iron, $R^{113}$ is hydrogen, halogen, preferably Cl, nitro or amidosulfonyl, $R^{213}$ is hydrogen or nitro, $R^{313}$ is hydrogen, the sulfo group, $-CO-NH-R^{413}$, where $R^{413}$ is phenyl or is alkyl having 1 to 5 carbon atoms which is unsubstituted or substituted by a mono-, di- or trialkylamino group, and G in each of formulae (12) and (13) is a counterion which establishes the neutrality of the complex, preferably one or more protons, one or more alkali metal ions or ammonium ions:

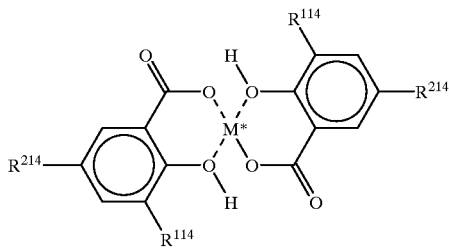

(14)

in which

M* is a divalent central metal atom, preferably a zinc atom, $R^{114}$ and $R^{214}$ are identical or different, straight-chain or branched alkyl groups having 1 to 8, preferably 3 to 6, carbon atoms, such as tert-butyl.

Compounds of this kind are exemplified characteristically by the CAS Numbers 31714-55-3, 104815-18-1, 84179-68-8, 110941-75-8, 32517-36-5, 38833-00- 00, 95692-86-7, 85414-43-3, 136709-14-3, 135534-82-6, 135534-81-5, 127800-82-2, 114803-10-0, 114803-08-6.

Examples of particularly preferred metal complex compounds of the formula (13) are shown in Table 1 below:

TABLE 1

| $R^{113}$ | $R^{213}$ | $R^{313}$ | $R^{413}$ | M' | G |
|---|---|---|---|---|---|
| Cl | H | H | — | Cr | H⁺ |
| NO₂ | NO₂ | —CONHR⁴¹³ | Phenyl | Cr | H⁺/Na⁺/NH₄⁺ |
| Cl | H | —CONHR⁴¹³ | Phenyl | Fe | H⁺/Na⁺/NH₄⁺ |
| Cl | H | —CONHR⁴¹³ | —(CH₂)₃—<br>—N⁺(CH₃)₃ | Cr | Cl⁻ |
| —SO₂NH₂ | H | H | — | Co | H⁺/Na⁺/NH₄⁺ |

Also suitable are benzimidazolones, as described in EP-A-0 347 695, especially those of the formula (15)

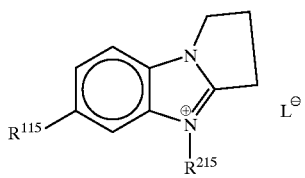

(15)

in which $R^{115}$ is an alkyl having 1 to 5 carbon atoms and $R^{215}$ is an alkyl having 1 to 12 carbon atoms and L is a stoichiometric equivalent of an anion, especially a chloride or tetrafluoroborate anion.

An example which may be mentioned is the compound where $R^{115}$=CH₃ and $R^{215}$=C₁₁H₂₃.

Also suitable are cyclically linked oligosaccharides, as described in DE-A-4 418 842, especially those of the formula (16)

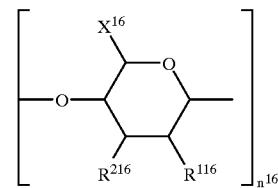

(16)

in which $n^{16}$ is a number between 3 and 100, $R^{116}$ and $R^{216}$ are defined as OH, $OR^{316}$, where $R^{316}$ is substituted or unsubstituted alkyl-($C_1$-$C_{18}$), aryl-($C_6$-$C_{12}$) or tosyl, and $X^{16}$ is defined as CH₂OH or $CH_2COR^{316}$. As examples there may be mentioned:

$n^{16}$=6, $R^{116}$ and $R^{216}$=OH, $X^{16}$=CH₂OH
$n^{16}$=7, $R^{116}$ and $R^{216}$=OH, $X^{16}$=CH₂OH
$n^{16}$=8, $R^{116}$ and $R^{216}$=OH, $X^{16}$=CH₂OH.

Other suitable compounds are polymer salts, as described in DE-A-4 332 170, whose anionic component is a polyester that consists of the reaction product of the individual components a), b) and c) and also, if desired, d) and, if desired, e), where a) is a dicarboxylic acid or a reactive derivative of a dicarboxylic acid, being free of sulfo groups, b) is a difunctional aromatic, aliphatic or cycloaliphatic sulfo compound whose functional groups are hydroxyl or carboxyl, or hydroxyl and carboxyl, c) is an aliphatic, cycloaliphatic or aromatic diol, a polyetherdiol or a polycarbonatediol, d) is a polyfunctional compound (functionality>2), whose functional groups are hydroxyl or carboxyl, or hydroxyl and carboxyl, and e) is a monocarboxylic acid and whose cationic component comprises hydrogen atoms or metal cations.

Also suitable are cyclooligosaccharide compounds, as described, for example, in DE-A-1 971 1260, which are obtainable by reacting a cyclodextrin or cyclodextrin derivative with a compound of the formula

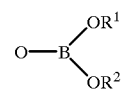

in which $R^1$ and $R^2$ are alkyl, preferably $C_1$-$C_4$-alkyl.

Suitability extends to interpolyelectrolyte complexes, as described, for example, in DE-A-197 32 995.

Suitable interpolyelectrolyte complexes are those consisting of one or more polyanion-forming compounds and of one or more polycation-forming compounds. Particularly suitable in this respect are compounds having a molar ratio of polymeric cationic to polymeric anionic groups of from 0.9:1.1 to 1.1:0.9.

Also suitable, especially when using P.Y. 155 in liquid toners (Handbook of Imaging Materials, 1991, Marcel Dekker, Inc., Chap. 6, Liquid Toner Technology), are surface-active ionic compounds and so-called metal soaps. Particularly suitable are alkylated arylsulfonates, such as barium petronates, calcium petronates, barium dinonylnaphthalenesulfonates (basic and neutral), calcium dinonylsulfonate or sodium dodecylbenzenesulfonate, and polyisobutylenesuccinimides (Chevron's Oloa 1200).

Also suitable are soya lecithin and N-vinylpyrrolidone polymers.

Also suitable are sodium salts of phosphated mono- and diglycerides having saturated and unsaturated substituents, AB diblock copolymers of A: polymers of 2-(N;N) dimethylaminoethyl methacrylate quaternized with methyl p-toluenesulfonate and B: poly-2-ethylhexyl methacrylate.

Also suitable, especially in liquid toners, are divalent and trivalent carboxylates, especially aluminum tristearate, barium stearate, chromium stearate, magnesium octoate, calcium stearate, iron naphthalite and zinc naphthalite.

Chelating charge control agents are also suitable, as described in EP 0 636 945 A1.

Also suitable are metallic (ionic) compounds, as described in EP 0 778 501 A1.

Also suitable are phosphate-metal salts, as described in JA 9 (1997)-106107.

Also suitable are azines of the following Colour Index numbers: C.I. Solvent Black 5, 5:1, 5:2, 7, 31 and 50; C.I. Pigment Black 1, C.I. Basic Red 2 and C.I. Basic Black 1 and 2.

In principle, C.I. Pigment Yellow 155 is suitable for combinations with positive and negative charge control agents (CCAs). In this context, judicious pigment concentrations are from 0.01 to 20% by weight, preferably from 0.1 to 5% by weight, of charge control agent, based on the overall weight of the electrophotographic toner or developer, powder or powder coating material, in order to establish the desired polarity. A particular advantage in this context is the rapid attainment of the peak charge level and its good constancy.

Pigment and charge control agent can be combined subsequently by physical mixing during pigment synthesis, during the finishing operation or by appropriate application to the pigment surface (pigment coating).

The invention therefore also provides an electrophotographic toner or developer comprising a conventional toner binder, from 0.1 to 60% by weight, preferably from 0.5 to 20% by weight, of shaded or unshaded C.I. Pigment Yellow 155, and from 0 to 20% by weight, preferably from 0.1 to 5% by weight, based in each case on the overall weight of the toner or developer, of a charge control agent from the class of the triphenylmethanes, ammonium and immonium compounds; fluorinated ammonium and immonium compounds; biscationic acid amides; polymeric ammonium compounds; diallylammonium compounds; aryl sulfide derivatives; phenol derivatives; phosphonium compounds and fluorinated phosphonium compounds; calix(n)arenes; cyclodextrins; polyester salts; metal complex compounds; cyclooligosaccharide boron complexes, interpolyelectrolyte complexes; benzimidazolones; azines, thiazines or oxazines.

Particular preference is given to electrophotographic toners or developers which comprise as charge control agent a compound of the formula (17)

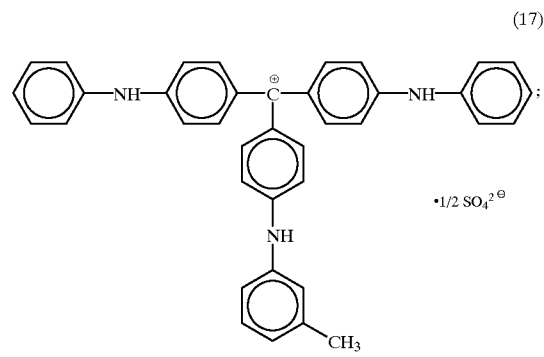

(17)

or a compound of the abovementioned formula (3);
or a compound of the abovementioned formula (5) in which $R^{15}$ and $R^{25}$ are each methyl and $A^{\ominus}$ is a tetraphenylborate anion;
or a compound of the abovementioned formula (6) in which $R^{15}$ and $R^{25}$ are each methyl, $A^{\ominus}$ is a tetraphenylborate anion and n has a value corresponding to molecular weights of from 5000 to 500,000 g/mol;
or a compound of the abovementioned formula (7);
or a compound of the abovementioned formula (13) in which $R^{113}$ is chlorine, $R^{213}$ and $R^{313}$ are hydrogen, M' is chromium, cobalt or iron, and G is one or two protons; or an abovementioned polymer salt whose anionic component is a polyester.

The invention additionally provides a powder or powder coating material comprising an epoxy-, carboxyl- or hydroxyl-containing polyester resin or acrylic resin or a combination thereof, from 0.1 to 60% by weight, preferably 0.5 to 20% by weight, of shaded or unshaded C.I. Pigment Yellow 155 and from 0 to 20% by weight, preferably from 0.1 to 5% by weight, based in each case on the overall weight of the powder or powder coating material, of a charge control agent selected from the preferred compounds and classes given above for electrophotographic toners.

The ready suitability of the azo pigment of the invention for application as a powder coating material is evident from the high charging current of 1.6 μA in Example 1.4.2 which can be achieved even at a spray pressure of 3 bar, a charging current of 1 μA being regarded typically as the minimum requirement for adequate charging. The high charging current is paralleled by a good deposition rate of distinctly more than 50%.

The pigment used in accordance with the invention is judiciously incorporated homogeneously—by extrusion or kneading, for example—in a concentration of from 0.1 to 60% by weight, preferably from 0.5 to 20% by weight and, with particular preference, from 0.1 to 5.0% by weight, based on the overall mixture, into the binder of the respective toner (liquid or dry), developer, coating material, powder coating material, electret material or of the polymer to be electrostatically separated. In this context, the pigment employed in accordance with the invention, and the abovementioned charge control agents as well, can be added as dried and ground powders, dispersions or suspensions in, for example, organic and/or inorganic solvents, presscakes (which can be used, for example, for the so-called flushing process), spray-dried presscakes, as described below, or as a masterbatch, preparation, made-up paste, as a compound coated from aqueous or nonaqueous solution onto a suitable support, such as kieselguhr, $TiO_2$ or $Al_2O_3$, or in some other form. The pigment content in the presscake and masterbatch is usually between 5 and 70% by weight, preferably between 20 and 50% by weight. In addition to this, the pigment used in accordance with the invention can also be employed in the form of a highly concentrated presscake, especially as a spray-dried presscake, where the pigment content lies between 25 and 95% by weight, preferably between 50 and 90% by weight. The spray-dried presscake can be prepared by customary methods.

For example, an aqueous, aqueous-organic or organic suspension of the pigment is spray-dried in an appropriate apparatus at conventional air entry temperatures, preferably between 100 and 400° C., and at conventional air exit temperatures, preferably between 50 and 200° C.

Examples of suitable spray drying apparatus are cocurrent dryers with centrifugal atomization, air brooms, countercurrent/cocurrent dryers with dual-substance nozzle atomization and also with two-point discharge of the dry product, countercurrent/cocurrent dryers with pressure nozzle atomization and two-point discharge, and units based on cocurrent drying and twin-nozzle atomization.

The spray-dried presscake of Pigment Yellow 155 is particularly low-dusting, has good free-flow properties, is readily dispersible and can be metered with ease.

The pigment used in accordance with the invention can also in principle be added during the actual preparation of respective binders, i.e., in the course of their addition polymerization, polyaddition or polycondensation.

The level of electrostatic charging of the electrophotographic toners or of the powder coating materials into which the pigment of the invention is homogeneously incorporated cannot be predicted and is measured in standard test systems under identical conditions (identical dispersion times, identical particle size distribution, identical particle morphology) at about 20° C. and 50% relative atmospheric humidity. The toner is electrostatically charged by being brought together turbulently on a roller bench (150 revolutions per minute) with a carrier, i.e., with a standardized friction partner (3 parts by weight of toner to 97 parts by weight of carrier). The electrostatic charge is then measured on a conventional q/m measurement setup (J. H. Dessauer, H. E. Clark, "Xerography and related Processes", Focal Press, N.Y., 1965, page 289; J. F. Hughes, "Electrostatic Powder Coating", Research Studies Press Ltd. Letchworth, Hertfordshire, England, 1984, Chapter 2). When determining the q/m value or the triboelectric charge of powder coating materials, a great influence is exerted by the particle size, which is why strict attention is paid to a uniform particle size distribution in the case of the samples of toner or powder coating material that are obtained by screen-classification. For instance, the target average particle size for toners is 10 μm whereas for powder coating materials an average particle size of 50 μm is practicable.

The triboelectric spraying of the powders or powder coating materials is carried out using a spray apparatus with a standard spray pipe and a star-shaped inner rod at maximum powder throughput with a spray pressure of 3 bar. For this purpose, the article to be sprayed is suspended in a spraybooth and is sprayed from a distance of about 20 cm directly from the front, without any further movement of the spray apparatus. The charge of each sprayed powder is then measured using a "device for measuring the triboelectric charge of powders" from Intec (Dortmund). To carry out the measurements, the antenna of the measuring device is held directly in the cloud of powder emerging from the spray apparatus. The current strength resulting from the electrostatic charge of powder coating material or powder is displayed in μA. The deposition rate is subsequently determined in % by differential weighing of the sprayed and of the deposited powder coating material.

The transparency of the azo pigment of the invention in toner binder systems is investigated as follows: 30 parts by weight of the pigmented test toner (prepared as in Example 1.4.1) are stirred with a dissolver (5 minutes at 5000 rpm) into 70 parts by weight of a base varnish (consisting of 15 parts by weight of the respective toner resin and 85 parts by weight of ethyl acetate).

The test toner varnish produced in this way is applied with a Handcoater onto suitable paper (e.g., letterpress paper) against a standard pigmented varnish produced in the same way. A suitable size for the coater bar is, for example, K bar N 3=24 μm coat thickness). To allow better determination of transparency, the paper has printed on it a black bar, and the transparency differences in terms of dL values are determined in accordance with DIN 55 988 or evaluated in accordance with the test procedure Pigments Marketing, Hoechst A G "Visuelle und Farbmetrische Bewertung" [Visual and calorimetric evaluation] dated Sep. 13, 1990 (No. 1/1).

The residual salt content which is indicated when the pigment is characterized describes the specific conductivity of the extract of an aqueous pigment suspension (in accordance with the test procedure from Pigments Marketing, Hoechst A G, No. 1/10 (2/91) "Bestimmung der spezifischen Leitfähigkeit am Extrakt einer wäβrigen Pigmentsuspension" [Determining the specific conductivity of an extract of an aqueous pigment suspension]) and the similarly indicated pH is determined in accordance with the test procedure from Pigments Marketing, Hoechst A G, 1/9 (2/91) "Bestimmung des pH-Wertes am Extrakt einer wäβrigen Pigmentsuspension" [Determining the pH of an extract of an aqueous pigment suspension], both methods of determination using double-distilled water instead of the deionized water specified in the test procedure documents.

It has additionally been found that C.I. Pigment Yellow 155 is suitable as a colorant in both aqueous and nonaqueous inkjet inks, especially in those inks which operate in accordance with the hotmelt process. Hotmelt inks are based mostly on waxes, fatty acids, fatty alcohols or sulfonamides which are solid at room temperature and liquefy when heated, the preferred melting range lying between about 60° C. and about 140° C. The invention also provides a hotmelt inkjet ink consisting essentially of from 20 to 90% by weight of wax, from 1 to 10% by weight of C.I. Pigment Yellow 155 and further customary additives and auxiliaries, such as from 0 to 20% by weight of an additional polymer (as dye solvent), from 0 to 5% by weight of dispersing auxiliaries, from 0 to 20% by weight of viscosity modifiers, from 0 to 20% by weight of plasticizers, from 0 to 10% by weight of adhesion additive, from 0 to 10% by weight of transparency stabilizer (which prevents, for example, crystallization of the waxes) and from 0 to 2% by weight of antioxidant. Typical additives and auxiliaries are described, for example, in U.S. Pat. No. 5,560,760.

The invention also provides inkjet inks on an aqueous basis (microemulsion inks) comprising from 0.5 to 30% by weight, preferably from 1.5 to 20% by weight, of C.I. Pigment Yellow 155, from 5 to 99% by weight of water and from 0.5 to 94.5% by weight of organic solvent and/or hydrotropic compound.

The invention also provides solvent-based inkjet inks, comprising from 0.5 to 30% by weight, preferably from 1.5 to 20% by weight, of C.I. Pigment Yellow 155, and from 85 to 94.5% by weight of organic solvent and/or hydrotropic compounds.

Water used to produce inkjet inks is preferably employed in the form of distilled or deionized water.

The solvents present in the inkjet inks may comprise an organic solvent or a mixture of such solvents. Examples of suitable solvents are mono- or polyhydric alcohols, their ethers and esters, such as alkanols, especially those having 1 to 4 carbon atoms, examples being methanol, ethanol, propanol, isopropanol, butanol and isobutanol; di- or trihydric alcohols, especially those having 2 to 5 carbon atoms, examples being ethylene glycol, propylene glycol, 1,3-propanediol, 4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol and polypropylene glycol; lower alkyl ethers of polyhydric alcohols, examples being ethylene glycol monomethyl, monoethyl or monobutyl ether and triethylene glycol monomethyl or monoethyl ether; ketones and ketone alcohols, examples being acetone, methyl ethyl ketone, diethyl ketone, methyl isobutyl ketone, methyl pentyl ketone, cyclopentanone, cyclohexanone and diacetone alcohol; amides, examples being dimethylformamide, dimethylacetamide and N-methylpyrrolidone, and toluene and n-hexane.

Hydrotropic compounds which may also serve as solvents if desired, that can be employed are, for example, formamide, urea, tetramethylurea, ε-caprolactam, ethylene glycol, diethylene glycol, triethylene glycol, polyethylene glycol, butyl glycol, methylcellosolve, glycerol, N-methylpyrrolidone, 1,3-diethyl-2-imidazolidinone, thiodiglycol, sodium benzenesulfonate, Na xylenesulfonate, Na toluenesulfonate, sodium cumenesulfonate, Na dodecylsulfonate, Na benzoate, Na salicylate or sodium butyl monoglycol sulfate.

The inkjet inks of the invention may also include further customary additives, examples being preservatives, cationic, anionic or nonionic surface-active substances (surfactants and wetting agents), and also viscosity regulators, such as polyvinyl alcohol, cellulose derivatives, or water-soluble natural or synthetic resins as film formers or binders for enhancing the adhesive strength and abrasion resistance.

Amines, such as ethanolamine, diethanolamine, triethanolamine, N,N-dimethylethanolamine or diisopropylamine, serve primarily to raise the pH of the recording fluid. They are normally present in the recording fluid in proportions of from 0 to 10% by weight, preferably from 0.5 to 5% by weight.

The inkjet inks of the invention can be prepared by dispersing shaded or unshaded C.I. Pigment Yellow 155 into the aqueous or nonaqueous medium of the inkjet ink, said pigment being in the form of a powder, pigment preparation, suspension or presscake. The presscake can also be a highly concentrated presscake, in particular a spray-dried presscake, as described above.

In addition, C.I. Pigment Yellow 155 is also suitable as a colorant for color filters, for both subtractive and additive color generation (P. Gregory, "Topics in Applied Chemistry: High Technology Application of Organic Colorants", Plenum Press, New York 1991, pp. 15–25).

In the examples which follow, parts and percentages are by weight.

EXAMPLE 1

1.1 Synthesis a) Diazo Component 41.8 parts of dimethyl aminoterephthalate are introduced with stirring into a mixture of 200 parts of water and 70 parts of HCl (31% strength) and the resulting mixture is stirred for a number of hours.

Diazotization is carried out at from 10 to 15° C. by adding 35 parts of $NaNO_2$ solution (40% strength), and the mixture is stirred for from 1 to 1.5 hours. The excess nitrite is destroyed with sulfamic acid. A pH of 4.5 is then established using sodium acetate solution (4N), with ice cooling.

b) Coupling Component 430 parts of NaOH (33% strength) are added to 450 parts of water, and 27.6 parts of 1,4-bis(acetoacetylamino) benzene are dissolved therein with stirring. 170 parts of ice are added, and the coupling component is subsequently precipitated with 263 parts of glacial acetic acids while stirring.

c) Coupling

The coupling suspension (b) is metered into the diazo component (a) over 40 minutes with stirring. Stirring is continued for about 2 hours, and any diazo excess is coupled by adding further coupling component.

d) Subsequently, the batch is heated to 98° C. by introduction of steam, stirred at 98° C. for 1 hour and filtered off hot with suction. The product is washed until salt-free and is dried in vacuo at 80° C.

The resulting 68 parts of the greenish Pigment Yellow P.Y. 155 are milled in a pinned disk mill.

1.2 Pigment Characteristics

BET surface area: 39.8 $m^2/g$

Residual moisture content (baking flask): 0.65%

Residual salt content: 90 $\mu S/cm$ pH: 6.5

Thermal stability: DTA (differential thermal analysis), 3° C./min heating rate, closed glass ampul, indicates a thermal stability of markedly more than 300° C. (beginning of decomposition from 310° C.).

Particle size and morphology (mass distribution counted using electron microscopy): particle size and morphology are determined by taking an electron micrograph of the pigment powder. For this purpose the pigment is dispersed in water for 15 minutes and then applied by spraying. The micrographs are taken at 13,000× and 29,000× magnification.

| Particle size | | |
|---|---|---|
| $d_{25}$: 50 nm | $d_{50}$: 65 nm | $d_{95}$: 83 nm |

X-ray diffraction diagram ($CuK_\alpha$ radiation):
2 theta (s=strong, m=moderate, w=weak):

| 2 theta | Intensity (relative Intensity) | Width at half peak height (2 theta) |
|---|---|---|
| 3.8 | w (10%) | 1.2 |
| 9.9 | s (53%) | 1.5 |
| 16.6 | m (13%) | 2.3 |
| 20.4 | m (14%) | 2.0 |
| 26.4 | s (100%) | 1.5 |

Dielectric Properties $\epsilon$ (1 kHz): 5.1

$\tan\delta$ (1 kHz): $2 \cdot 10^{-2}$ $\Omega \cdot$ cm: $1 \cdot 10^{16}$ 1.3 Transparency In a toner resin (polyester based on bisphenol A) an improved transparency was measured (24 $\mu$m coat thickness), the pigmented test toner being prepared as in Example 1.4.1.

Relative to the standard indicated in Comparative Example 2, the transparency found at a color strength of about 50% is greater by 4-5 evaluation units.

Evaluation of the transparency differences in accordance with test procedure 1/1: 1=trace, 2 =somewhat; 3 =noticeably; 4 =distinctly; 5 =substantially; 6 =significantly more transparent.

1.4 Electrostatic Properties 1.4.1 Toner 5 parts of the pigment from Example 1.1 are incorporated homogeneously by means of a kneading apparatus into 95 parts of a toner binder (polyester based on bisphenol A, ®Almacryl T500) over a period of 30 minutes. The mixture is subsequently milled on a universal laboratory mill and then classified in a centrifugal classifier. The desired particle fraction (from 4 to 25 µm) is activated with a carrier consisting of silicone-coated ferrite particles having a size of from 50 to 200 µm (bulk density 2.75 g/cm$^3$) (FBM 96-100; Powder Techn.).

Measurement takes place on a conventional q/m measurement setup. A screen with a mesh size of 25 µm is used to make sure that, when the toner is blown out, no carrier is ejected with it. The measurements are carried out at about 50% relative humidity. As a function of the activation period, the following q/m values [µC/g] are measured:

| Activation period | Charge q/m [µC/g] |
|---|---|
| 5 min | −14 |
| 10 min | −14 |
| 30 min | −12 |
| 2 h | −9 |
| 24 h | −7 |

1.4.2 Powder Coating Material 5 parts of the pigment are incorporated homogeneously as described in Example 1.4.1 into 95 parts of a powder coating binder based on a TGIC polyester such as ®Uralac P5010 (DSM, Netherlands). To determine the deposition rate, 30 g of the test powder coating material are sprayed through a triboelectric gun at a defined pressure. The amount of powder coating material deposited can be determined by differential weighing, and a deposition rate in % defined, and it is also possible to derive a current flow (µA) from the charge transfer.

| Pressure [bar] | Current [µA] | Deposition rate [%] |
|---|---|---|
| 3 | 1.6 | 77 |

1.4.3 Toner 5 parts of the pigment from Example 1.1 and 1 part of the charge control agent described in DE-A-3 901 153, Preparation Example 1 (highly fluorinated ammonium salt with n=2–5), of the formula

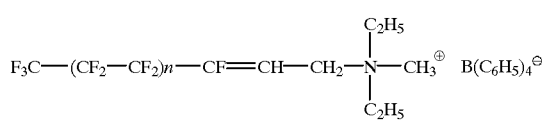

are incorporated into a polyester toner binder and measured as described in Example 1.4.1.

As a function of the activation period, the following q/m values are measured:

| Activation period | q/m [µC/g] |
|---|---|
| 5 min | −15 |
| 10 min | −13 |
| 30 min | −10 |
| 2 h | −9 |
| 24 h | −9 |

1.4.4 Toner 5 parts of the pigment from Example 1.1 are incorporated into a toner resin and measured as in Example 1.4.1 but using a styrene-acrylate copolymer 60:40 (®Dialec S309 from Diamond Shamrock) instead of the polyester resin as toner binder and using magnetite particles of size 50-200 µm coated with styrene-methacrylic copolymer (90:10) (90 µm Xerographic Carrier, Plasma Materials Inc., N.H., U.S.A.) as carrier.

As a function of the activation period, the following q/m values are measured:

| Activation period | q/m [µC/g] |
|---|---|
| 5 min | −7 |
| 10 min | −8 |
| 30 min | −14 |
| 2 h | −18 |
| 24 h | −21 |

1.4.5 Toner 5 parts of the pigment from Example 1.1 and 1 part of the charge control agent described in DE-A-4 031 705, Example 5, of the formula

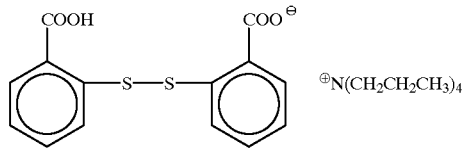

are incorporated into a styrene-acrylate toner binder and measured as described in Example 1.4.4.

As a function of the activation period, the following q/m values were measured:

| Activation period | q/m [µC/g] |
|---|---|
| 5 min | −3 |
| 10 min | −3 |
| 30 min | +3 |
| 2 h | +5 |
| 24 h | +5 |

Example 1.4.6.

5 parts of the pigment from Example 1.1 in the form of a highly concentrated spray-dried presscake are incorporated into 95 parts of a polyester toner binder and measured as described in Example 1.4.1, the pigment content of the readily free-flowing and low-dusting presscake being 81.3%.

The pH of the presscake was found to be 6.9. Color strength, hue and transparency correspond to the pigment characteristics described in Example 1.2. As a function of the activation period, the following q/m values [$\mu$C/g] were measured.

| Activation period | Charge q/m [$\mu$C/g] |
|---|---|
| 5 min | −14 |
| 10 min | −13 |
| 30 min | −13 |
| 2 h | −9 |
| 24 h | −6 |

1.5 Aqueous and Nonaqueous Inkjet Inks.

1.5.1

10 parts of a finely ground 50% pigment preparation (P.Y. 155) based on polyvinyl chloride-polyvinyl acetate copolymer (e.g. ®Vinol 15/45 from Wacker or ®Vilith AS 42 from Hüls), the homogeneous pigment dispersion being achieved by intensive kneading incorporation into the copolymer, are introduced with stirring, using a dissolver, into a mixture of 80 parts of methyl isobutyl ketone and 10 parts of 1,2-propylene glycol.

An inkjet ink having the following composition is obtained:

5 parts of C.I. Pigment Yellow 155

5 parts of polyvinyl chloride-polyvinyl acetate copolymer 10 parts of 1,2-propylene glycol 80 parts of methyl isobutyl ketone 1.5.2

First 75 parts of deionized water and then 6 parts of ®Mowilith DM 760 (acrylate dispersion), 2 parts of ethanol, 5 parts of 1,2-propylene glycol and 0.2 part of ®Mergal K7 are added with stirring (paddle stirrer or dissolver) to 5 parts of Pigment Yellow 155 which is present in the form of a 40% ultrafine aqueous pigment preparation.

An inkjet ink of the following composition is obtained:

5 parts of Pigment Yellow 155

6 parts of Mowilith DM 760 (acrylate dispersion)

2 parts of ethanol 5 parts of 1,2-propylene glycol 0.2 part of Mergal K7

81.8 parts of deionized water.

1.5.3

First 80 parts of deionized water and then 4 parts of ®Luviskol K30 (polyvinylpyrrolidone, BASF), 5 parts of 1,2-propylene glycol and 0.2 part of Mergal K7 are added with stirring to 5 parts of C.I. Pigment Yellow 155 which is present in the form of a 40% by weight ultrafine aqueous pigment preparation.

An inkjet ink of the following composition is obtained:

5 parts of Pigment Yellow 155

4 parts of Luviskol K30 (polyvinylpyrrolidone)

5 parts of 1,2-propylene glycol 0.2 part of Mergal K7

85.8 parts of deionized water.

EXAMPLE 2

2.1 Synthesis

Diazo Component a) 104.5 parts of dimethyl aminoterephthalate are introduced with stirring into a mixture of 70 parts of water, 111.5 parts of glacial acetic acid, 150 parts of hydrochloric acid (30%) and 0.3 part of sodium dinaphthylmethanedisulfonate and the mixture is stirred for at least 4 hours. By attaching an icebath and adding 100 parts of ice, the suspension is cooled to about 0° C., an aqueous solution (about 150 parts) of 35.2 parts of sodium nitrite is added below the surface, stirring is continued for 1 hour at from 0° to +5° C. with addition of ice, and during this stirring period the suspension becomes a clear, yellowish brown solution. Subsequently, the excess nitrite is destroyed by adding a small amount of sulfamic acid solution. For purification, 5 parts of commercial filtering earth are added to the solution, the mixture is stirred, the residue is removed by filtration and the filter product is washed with a little water.

b) Coupling Component 93.1 parts of NaOH (30%) are added to 500 parts of water at 10° C., 69.0 parts of 1,4-bis(acetoactylamino)benzene are introduced, the mixture is stirred for about 30 minutes, then 5.0 parts of filtering earth are added, stirring is continued, the solution is filtered and the filter product is washed with a little water. Subsequently, a solution of 400 parts of water, 400 parts of ice, 73.5 parts of glacial acetic acid and 53.2 parts of NaOH (30%) is added to the former solution over the course of 30 minutes.

c) Coupling

For coupling, the diazonium salt solution from a) is run over the course of 2 hours and below the surface into the suspension from b), the mixture is stirred for 2 hours at gently increasing temperature, one hour at 40 to 45° C., a further hour at 60 to 65° C. and finally for one hour at 80° C. The resulting yellow precipitate is filtered off, washed with cold water until free of salt and dried under vacuum (residual water content <1%).

d) Concluding Treatment 71.6 parts of the crude pigment thus obtained are heated at 150° C. for 2 hours with 570 parts of dimethylformamide, stirred at this temperature for a further hour, cooled to 80 to 100° C., isolated by filtration, washed with a low-boiling alcohol, dried and ground.

2.2 Pigment Characteristics

BET surface area: 35 m$^2$/g

Residual moisture content: 0.3%

Residual salt content: 70 $\mu$S/cm pH: 6.5

Thermal stability: markedly greater than 300° C.
(beginning of decomposition at about 330° C.)

Particle size: $d_{25}$: 150 nm $d_{50}$: 200 nm $d_{75}$: 260 nm

Particle morphology:
(length-width ratio) approximately 3:1

X-ray diffraction diagram:

| 2 Theta | Intensity (relative Intensity) | Width at half peak height 2 Theta |
|---|---|---|
| 5.5 | m (13%) | 0.5 |
| 10.0 | s (71 %) | 0.4 |
| 11.1 | m (26%) | 0.4 |
| 16.7 | m (22%) | 0.6 |
| 17.6 | m (11%) | 0.5 |
| 19.2 | m (26%) | 0.6 |
| 20 | w (4%) | 0.5 |
| 21.8 | m (17%) | 0.6 |

-continued

| 2 Theta | Intensity (relative Intensity) | Width at half peak height 2 Theta |
|---|---|---|
| 25 | w (5%) | 0.5 |
| 26.8 | s (100%) | 0.6 |
| 28.9 | w (4%) | 0.5 |
| 30.3 | w (4%) | 0.8 |

Dielectric Characteristics $\epsilon$ (1 kHz): 5.0

$\tan\delta$ (1 kHZ): $7 \cdot 10^{-2}$ $\Omega$ cm: $1 \cdot 10^{16}$ 2.3 Transparency Relative to the standard indicated in Comparative Example 2, the hiding power found at about 80% color strength is higher by 5 evaluation units, with a markedly greener hue.

2.4 Electrostatic Properties 2.4.1 The procedure described in Example 1.4.1 is repeated but now incorporating 5 parts of the pigment from Example 3.1 instead of 5 parts of the pigment from Example 1.1. As a function of the activation period, the following q/m values are measured:

| Activation period | Charge q/m [$\mu$C/g] |
|---|---|
| 5 min | −12 |
| 10 min | −12 |
| 30 min | −12 |
| 2 h | −10 |
| 24 h | −9 |

3. Polyester Resin Without Pigment 100 parts of the toner binder described in Example 1.4.1 (polyester based on bisphenol A) are processed as in Example 1.4.1 without the addition of pigment and are subsequently measured.

As a function of the activation period, the following q/m values are measured:

| Activation period | Charge q/m [$\mu$C/g] |
|---|---|
| 5 min | −15 |
| 10 min | −14 |
| 30 min | −14 |
| 2 h | −14 |
| 24 h | −9 |

It is evident that P.Y. 155 has virtually no effect on the inherent electrostatic effect of the toner binder.

COMPARATIVE EXAMPLE 1

A test toner is prepared and measured as described in Example 1.4.1, but now incorporating 5 parts of a C.I. Pigment Yellow 180 (benzimidazolone pigment, for preparation see EP 0 705 886 A2 Example 1.1) instead of 5 parts of the pigment from Example 1.1.

As a function of the activation period, the following q/m values are measured:

| Activation period | Charge q/m [$\mu$C/gl] |
|---|---|
| 5 min | 0 |
| 10 min | 0 |
| 30 min | 0 |
| 2 h | −7 |
| 24 h | −8 |

COMPARATIVE EXAMPLE 2

A test toner is prepared and measured as described in Example 1.4.1, but now incorporating 5 parts of a C.I. Pigment Yellow 180 (commercial ®Novoperm-Gelb P-HG, Clariant GmbH, see EP 0 705 886 A2 Comparative Examples) instead of 5 parts of the pigment from Example 1.1.

As a function of the activation period, the following q/m values are measured:

| Activation period | Charge q/m [$\mu$C/g] |
|---|---|
| 5 min | −10 |
| 10 min | −10 |
| 30 min | −10 |
| 2 h | −20 |
| 24 h | −19 |

Both comparative examples show that P.Y. 180 greatly influences the inherent electrostatic effect of the toner binder.

4. Styrene-acrylate Resin without Pigment

The procedure of Example 3 is repeated but using the styrene-acrylate copolymer from Example 1.4.4 as toner binder. The carrier used is likewise the magnetite employed in Example 1.4.4.

As a function of the activation period, the following q/m values are measured:

| Activation period | q/m [$\mu$d/g] |
|---|---|
| 5 min | −10 |
| 10 min | −7 |
| 30 min | −11 |
| 2 h | −16 |
| 24 h | −22 |

What is claimed is:

1. A method of coloring electrophotographic toners and developers, powders and powder coating materials, electret materials, color filters and inkjet inks comprising the addition of an azo pigment of the formula (1)

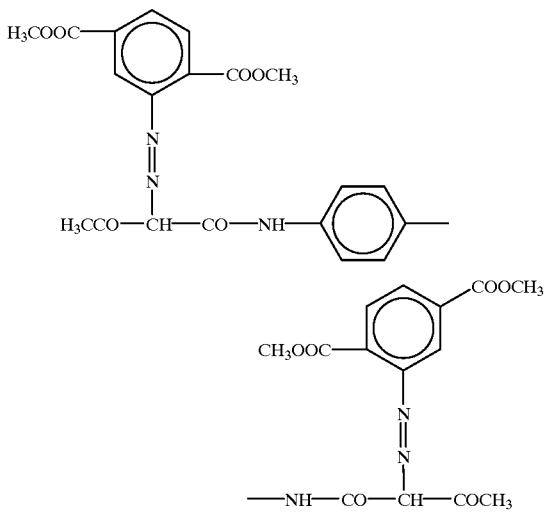

to a toner binder, a powder coating resin, an electret material, a color filter material, an aqueous or non-aqueous basis of an inkjet ink.

2. The method as claimed in claim 1, wherein the electrophotographic toner is a liquid toner or a powder toner.

3. The method as claimed in claim 1, wherein the azo pigment of the formula (1) is shaded with a further pigment or dye.

4. The method as claimed in claim 1, wherein the azo pigment of the formula (1) is employed in combination with a charge control agent from the class of the triphenylmethanes, ammonium and immonium compounds; iminium compounds; fluorinated ammonium and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n) arenes; cyclically linked oligosaccharides, interpolyelectrolyte complexes; polyester salts; metal complex compounds, α-hydroxycarboxylic acid-nonmetal complexes, benzimidazolones; and azines, thiazines or oxazines.

5. The method as claimed in claim 3, wherein the azo pigment of the formula (1) is employed in combination with a charge control agent from the class of the triphenylmethanes, ammonium and immonium compounds; iminium compounds; fluorinated ammonium and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n) arenes; cyclically linked oligosaccharides, interpolyelectrolyte complexes; polyester salts; metal complex compounds, α-hydroxycarboxylic acid-nonmetal complexes; benzimidazolones; and azines, thiazines or oxazines.

6. The method as claimed in claim 1, wherein the azo pigment of the formula (1) and, optionally, the charge control agent are incorporated as a dried and ground powder, as a suspension or as a presscake into the binder or resin.

7. The method as claimed in claim 3, wherein the shaded azo pigment of the formula (1) and, optionally, the charge control agent are incorporated as a dried and ground powder, as a suspension or as a presscake into the binder or resin.

8. The method as claimed in claim 6, wherein the presscake is a spray-dried presscake.

9. The method as claimed in claim 7, wherein the presscake is a spray-dried presscake.

10. An inkjet ink comprising from 0.5 to 30% by weight, based on the overall weight of the ink, of the azo pigment of formula (1) defined in claim 1, from 5 to 99% by weight of water and from 0.5 to 94.5% by weight of organic solvent, hydrotropic compound or a combination thereof.

11. An inkjet ink comprising from 0.5 to 30% by weight, based on the overall weight of the ink, of the shaded azo pigment of formula (1) defined in claim 3, from 5 to 99% by weight of water and from 0.5 to 94.5% by weight of organic solvent, hydrotropic compound or a combination thereof.

12. An inkjet ink comprising from 0.5 to 30% by weight, based on the overall weight of the ink, of the azo pigment of formula (1) defined in claim 1, from 85 to 94.5% by weight of organic solvent, hydrotropic compound or a combination thereof.

13. An inkjet ink comprising from 0.5 to 30% by weight, based on the overall weight of the ink, of the shaded azo pigment of formula (1) defined in claim 3, from 85 to 94.5% by weight of organic solvent, hydrotropic compound or a combination thereof.

14. A hotmelt inkjet ink consisting essentially of from 20 to 90% by weight of wax, from 1 to 10% by weight of the azo pigment of the formula (1) defined in claim 1, and further, customary additives and auxiliaries.

15. A hotmelt inkjet ink consisting essentially of from 20 to 90% by weight of wax, from 1 to 10% by weight of the shaded azo pigment of the formula (1) defined in claim 3, and further, customary additives and auxiliaries.

16. An electrophotographic toner or developer comprising a customary toner binder, from 0.1 to 60% by weight of azo pigment of the formula (1) as claimed in claim 1, and from 0 to 20% by weight based in each case on the overall weight of the toner or developer, of a charge control agent from the class of the triphenylmethanes, ammonium and immonium compounds; fluorinated ammonium and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n) arenes; cyclodextrins; polyester salts; metal complex compounds; cyclooligosaccharide boron complexes, interpolyelectrolyte complexes; benzimidazolones; azines, thiazines and oxazines.

17. An electrophotographic toner or developer comprising a customary toner binder, from 0.1 to 60% by weight of shaded azo pigment of the formula (1) as claimed in claim 3, and from 0 to 20% by weight based in each case on the overall weight of the toner or developer, of a charge control agent from the class of the triphenylmethanes, ammonium and immonium compounds; fluorinated ammonium and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n)arenes; cyclodextrins; polyester salts; metal complex compounds; cyclooligosaccharide boron complexes, interpolyelectrolyte complexes; benzimidazolones; azines, thiazines and oxazines.

18. A powder coating material, comprising an epoxy-, carboxyl- or hydroxyl-containing polyester resin or acrylic resin or a combination thereof, from 0.1 to 60% by weight of azo pigment of the formula (1) as claimed in claim 1 and from 0 to 20% by weight based in each case on the overall weight of the powder or powder coating material, of a charge control agent from the class of the triphenylmethanes, ammonium and immonium compounds; fluorinated ammonium and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n)arenes; cyclodextrins, polyester salts; metal complex compounds; cyclooligosaccharide boron complexes, interpolyelectrolyte complexes; benzimidazolones; azines, thiazines and oxazines.

19. A powder coating material, comprising an epoxy-, carboxyl- or hydroxyl-containing polyester resin or acrylic resin or a combination thereof, from 0.1 to 60% by weight of shaded azo pigment of the formula (1) as claimed in claim 3 and from 0 to 20% by weight based in each case on the overall weight of the powder or powder coating material, of a charge control agent from the class of the triphenylmethanes, ammonium and immonium compounds; fluorinated ammonium and fluorinated immonium compounds; biscationic acid amides; polymeric ammonium compounds; diallylammonium compounds; aryl sulfide derivatives; phenol derivatives; phosphonium compounds and phosphonium compounds; calix(n)arenes; cyclodextrins, polyester salts; metal complex compounds; cyclooligosaccharide boron complexes, interpolyelectrolyte complexes; benzimidazolones; azines, thiazines and oxazines.

* * * * *